US012535756B2

(12) United States Patent
Miyakai et al.

(10) Patent No.: US 12,535,756 B2
(45) Date of Patent: Jan. 27, 2026

(54) ELECTROPHOTOGRAPHIC MEMBER, FIXING APPARATUS AND ELECTROPHOTOGRAPHIC IMAGE FORMING APPARATUS

(71) Applicant: CANON KABUSHIKI KAISHA, Tokyo (JP)

(72) Inventors: Tomoyo Miyakai, Tokyo (JP); Kosuke Tanaka, Chiba (JP); Ryunosuke Kawahara, Ibaraki (JP); Akeshi Asaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/746,415

(22) Filed: Jun. 18, 2024

(65) Prior Publication Data

US 2025/0004404 A1 Jan. 2, 2025

(30) Foreign Application Priority Data

Jun. 27, 2023 (JP) ................................ 2023-104692

(51) Int. Cl.
*G03G 15/20* (2006.01)

(52) U.S. Cl.
CPC ....... *G03G 15/2057* (2013.01); *G03G 15/206* (2013.01); *G03G 15/2064* (2013.01)

(58) Field of Classification Search
CPC ............. G03G 15/2057; G03G 15/206; G03G 15/2064
See application file for complete search history.

(56) References Cited

U.S. PATENT DOCUMENTS

| | | | |
|---|---|---|---|
| 5,083,168 | A | 1/1992 | Kusaka et al. |
| 5,149,941 | A | 9/1992 | Hirabayashi et al. |
| 5,162,634 | A | 11/1992 | Kusaka et al. |
| 5,262,834 | A | 11/1993 | Kusaka et al. |

(Continued)

FOREIGN PATENT DOCUMENTS

| | | | |
|---|---|---|---|
| CN | 102770814 | A | 11/2012 |
| CN | 115702394 | A | 2/2023 |

(Continued)

OTHER PUBLICATIONS

Netzsch: "PFA: Perfluoroalkoxy," Retrieved from the Internet: URL:https://analyzing-testing.netzsch.com/en/polymers-netzsch-com/hig••temperature-resistant-thermoplastics/pfa-perfluoroalkoxy Dec. 2024 (XP002812782).

(Continued)

*Primary Examiner* — Sandra Brase
(74) *Attorney, Agent, or Firm* — Venable LLP

(57) ABSTRACT

An electrophotographic member comprising: at least a base layer; an elastic layer; and a surface layer in this order, wherein the surface layer comprises a tetrafluoroethylene-perfluoroalkyl vinyl ether copolymer, at an endothermic curve upon performing two measurements at a ramp up rate and a ramp down rate both set at 20° C./min using a differential scanning calorimeter (DSC) with a sample sampled from the surface layer as a measurement sample, an endothermic peak temperature in a second temperature raising process is 304° C. or less, an endothermic quantity in a first temperature raising process is 21J/g or more, and D3 is 40 μm or less, where D3 represents an area average diameter of a spherulite at an outer surface of the surface layer.

13 Claims, 3 Drawing Sheets

(56) References Cited

U.S. PATENT DOCUMENTS

| | | | | |
|---|---|---|---|---|
| 5,300,997 | A | 4/1994 | Hirabayashi et al. | |
| 5,343,280 | A | 8/1994 | Hirabayashi et al. | |
| 5,486,442 | A | 1/1996 | Takimoto et al. | |
| 5,697,037 | A | 12/1997 | Yano et al. | |
| 5,767,484 | A | 6/1998 | Hirabayashi et al. | |
| 7,682,542 | B2 | 3/2010 | Chen et al. | |
| 8,086,160 | B2 | 12/2011 | Hirabayashi et al. | |
| 8,263,702 | B2 | 9/2012 | Zhang et al. | |
| 8,787,810 | B2 | 7/2014 | Sakakibara et al. | |
| 11,966,181 | B2 | 4/2024 | Nemoto et al. | |
| 2002/0025184 | A1 | 2/2002 | Ishikawa et al. | |
| 2009/0092426 | A1 | 4/2009 | Nishizawa et al. | |
| 2011/0249995 | A1 | 10/2011 | Uchida et al. | |
| 2012/0014726 | A1 | 1/2012 | Sekihara et al. | |
| 2012/0195654 | A1 | 8/2012 | Sakakibara et al. | |
| 2012/0309602 | A1 | 12/2012 | Nakajima et al. | |
| 2013/0260299 | A1 | 10/2013 | Nakajima et al. | |
| 2015/0241825 | A1 | 8/2015 | Miura et al. | |
| 2015/0378272 | A1* | 12/2015 | Hase | G03G 15/2057 430/124.1 |
| 2017/0097597 | A1* | 4/2017 | Maeda | G03G 15/2057 |
| 2022/0206419 | A1 | 6/2022 | Muramatsu et al. | |

FOREIGN PATENT DOCUMENTS

| | | | | |
|---|---|---|---|---|
| EP | 3 153 931 | A2 | | 4/2017 |
| EP | 4 020 091 | A1 | | 6/2022 |
| JP | 63-313182 | A | | 12/1988 |
| JP | 2-157878 | A | | 6/1990 |
| JP | 8-220907 | A | | 8/1996 |
| JP | 2000-010430 | | * | 1/2000 |
| JP | 2000-10430 | A | | 1/2000 |
| JP | 2003-76190 | A | | 3/2003 |
| JP | 2005-84225 | A | | 3/2005 |
| JP | 2007-93650 | A | | 4/2007 |
| JP | 2007-187889 | A | | 7/2007 |
| JP | 2007-322751 | A | | 12/2007 |
| JP | 2009-25612 | A | | 2/2009 |
| JP | 2013-105080 | A | | 5/2013 |

OTHER PUBLICATIONS

Extended European Search Report in European Application No. 24184209.5 (Feb. 2025).

Non-final Office Action in U.S. Appl. No. 18/748,477, filed Jun. 2025.

Molykote® HP-300 Grease, Dow Corning (2025).

Molykote® HP-300 Grease, DuPont (2025).

Kawahara et al., U.S. Appl. No. 18/744,797, filed Jun. 17, 2024.

Muramatsu et al., U.S. Appl. No. 18/748,477, filed Jun. 20, 2024.

Ishifuji et al., U.S. Appl. No. 18/748,499, filed Jun. 20, 2024.

* cited by examiner

ELECTROPHOTOGRAPHIC MEMBER, FIXING APPARATUS AND ELECTROPHOTOGRAPHIC IMAGE FORMING APPARATUS

BACKGROUND OF THE INVENTION

Field of the Invention

The present disclosure relates to an electrophotographic member for use in a fixing apparatus of an electrophotographic image forming apparatus, and a fixing apparatus including the electrophotographic member and an electrophotographic image forming apparatus.

Description of the Related Art

As the electrophotographic member such as a fixing member for use in a fixing apparatus of an electrophotographic image forming apparatus such as a printer, a copier, or a facsimile, there is a film shaped or roller shaped one. As the fixing member, there is known the one configured such that, for example, on a film-shaped or roller-shaped base material made of a heat-resistant resin or made of a metal, if required, an elastic layer or a surface layer including heat-resistant rubber, or the like is formed. For example, for the surface layer, a fluorocarbon resin having releasability, or the like is used.

The elastic layer functions as a layer for imparting the flexibility to the fixing member in order to ensure the fixing nip in the fixing apparatus, or in order to allow the surface of the fixing member to follow the unevenness of paper. Further, for the surface layer, as a fluorocarbon resin having excellent releasability with respect to the toner, tetrafluoroethylene-perfluoro alkyl vinyl ether copolymer (PFA) is preferably used. In recent years, from the viewpoint of reduction of the running cost and energy conservation, the fixing member has been required to have a longer life. Particularly, the surface layer of the fixing member tends to undergo wear due to the paper sheet end, which largely affects the life of the fixing member.

Japanese Patent Application Publication No. 2007-093650 proposes the technology of coating the core metal with PFA, and then, performing heating to a temperature equal to or higher than the melting point of the PFA, followed by gradual cooling, thereby increasing the degree of crystallinity of the PFA, for improving the wear resistance.

Further, Japanese Patent Application Publication No. 2000-010430 proposes that high surface smoothness is obtained by using a fluorocarbon resin in which the size of a spherulite is small as a surface layer.

SUMMARY OF THE INVENTION

As in Japanese Patent Application Publication No. 2007-093650, the fixing member is heated to a temperature equal to or higher than the melting point of PFA, i.e., the surface layer, followed by gradual cooling, which can increase the degree of crystallinity of PFA, and can improve the wear resistance against the paper sheet. However, according to the study by the present inventors, when PFA is gradually cooled, the crystal growth rate increases relative to the frequency of occurrence of the spherulite nucleus, and hence a large spherulite may be formed on the surface of the surface layer. Then, the unevenness increases along the spherulite shape, so that the surface smoothness of the fixing member is reduced. For this reason, the unevenness of the surface of the surface layer is transferred onto the image surface, unfavorably resulting in a problem of the reduction of the image gloss value.

Under such circumstances, by using, for example, 451HP-J (trade name: manufactured by Chemours-Mitsui Floroproducts Co., Ltd.), i.e., a fluorocarbon resin in which the size of a spherulite is small as the surface layer as in Japanese Patent Application Publication No. 2000-010430, it is possible to obtain a fixing member having high surface smoothness. However, when PFA with a high melting point as with 451HP-J is used, the rigidity of the molecule is high. For this reason, the flexibility of the surface layer is reduced. For this reason, even when the fixing member is imparted with flexibility by the elastic layer, the followability to the unevenness of a of paper sheet is insufficient, which may result in the loss of the image quality. Therefore, the present inventors recognized that there is still a problem for satisfying all of the wear resistance to a paper sheet, the image glossiness, and the followability to the unevenness of a paper sheet.

At least one aspect of the present disclosure is targeted for providing an electrophotographic member contributing to the stable formation of a high quality electrophotographic image. Further, at least another aspect of the present disclosure is targeted for providing a fixing apparatus contributing to the stable formation of a high quality electrophotographic image. Still further, at least a still other aspect of the present disclosure is targeted for providing an electrophotographic image forming apparatus capable of stably forming a high quality electrophotographic image.

At least one aspect of the present disclosure relates to an electrophotographic member comprising: at least a base layer; an elastic layer; and a surface layer in this order, wherein

- the surface layer comprises a tetrafluoroethylene-perfluoroalkyl vinyl ether copolymer,
- at an endothermic curve upon performing two measurements at a ramp up rate and a ramp down rate both set at 20° C./min using a differential scanning calorimeter (DSC) with a sample sampled from the surface layer as a measurement sample,
- an endothermic peak temperature in a second temperature raising process is 304° C. or less,
- an endothermic quantity in a first temperature raising process is 21 J/g or more, and
- D3 is 40 μm or less, where D3 represents an area average diameter of a spherulite at an outer surface of the surface layer.

At least one aspect of the present disclosure relates to a fixing apparatus in an electrophotographic image forming apparatus,

- the fixing apparatus comprising: a fixing member; and a pressurizing member arranged opposed to the fixing member, wherein
- at least one of the fixing member and the pressurizing member is the above electrophotographic member.

At least one aspect of the present disclosure relates to an electrophotographic image forming apparatus comprising a fixing apparatus, wherein

- the fixing apparatus includes a fixing member, and a pressurizing member arranged opposed to the fixing member, and
- at least one of the fixing member and the pressurizing member is the above electrophotographic member.

At least one aspect of the present disclosure can provide an electrophotographic member contributing to the stable formation of a high quality electrophotographic image. Further, at least another aspect of the present disclosure can provide a fixing apparatus contributing to the stable formation of a high quality electrophotographic image. Still further, at least a still other aspect of the present disclosure can provide an electrophotographic image forming apparatus capable of stably forming a high quality electrophotographic image.

Further features of the present invention will become apparent from the following description of exemplary embodiments with reference to the attached drawings.

DESCRIPTION OF THE EMBODIMENTS

In the present specification, the term "from XX to YY" or "XX to YY" indicative of the numerical value range means the numerical value range including the lower limit and the upper limit, i.e., the endpoints unless otherwise specified. Further, when the numerical value range is described in steps, the upper limits and the lower limits of respective numerical value ranges can be arbitrarily combined. Below, the embodiments of the present disclosure will be described in detail. Incidentally, the technical scope of the present disclosure is not limited to the following description.

An electrophotographic member in accordance with at least one aspect of the present disclosure has at least a base layer, an elastic layer, and a surface layer in this order, in which

- the surface layer includes a tetrafluoroethylene-perfluoroalkyl vinyl ether copolymer,
- at an endothermic curve upon performing two measurements at a ramp up rate and a ramp down rate both set at 20° C./min with a sample sampled from the surface layer as a measurement sample using a differential scanning calorimeter (DSC),
- the endothermic peak temperature in the second temperature raising process is 304° C. or less, and
- the endothermic quantity in the first temperature raising process is 21 J/g or more, and
- D3 is 40 μm or less where D3 denotes the area average diameter of the spherulite at the outer surface of the surface layer.

Electrophotographic Member

An electrophotographic member which is at least one aspect of the present disclosure is, for example, a fixing member. For example, the electrophotographic member is a fixing belt. Further, the electrophotographic member may be an electrophotographic belt having an endless shape. The electrophotographic member has at least a base layer, an elastic layer, and a surface layer in this order. Namely, the electrophotographic member has a base layer, an elastic layer on the base layer, and a surface layer on the elastic layer. Between respective layers of the base layer, the elastic layer, and the surface layer, and on the inner circumferential surface side of the base layer and the outer circumferential surface side of the surface layer, if required, other layers may be provided.

Figure 2:
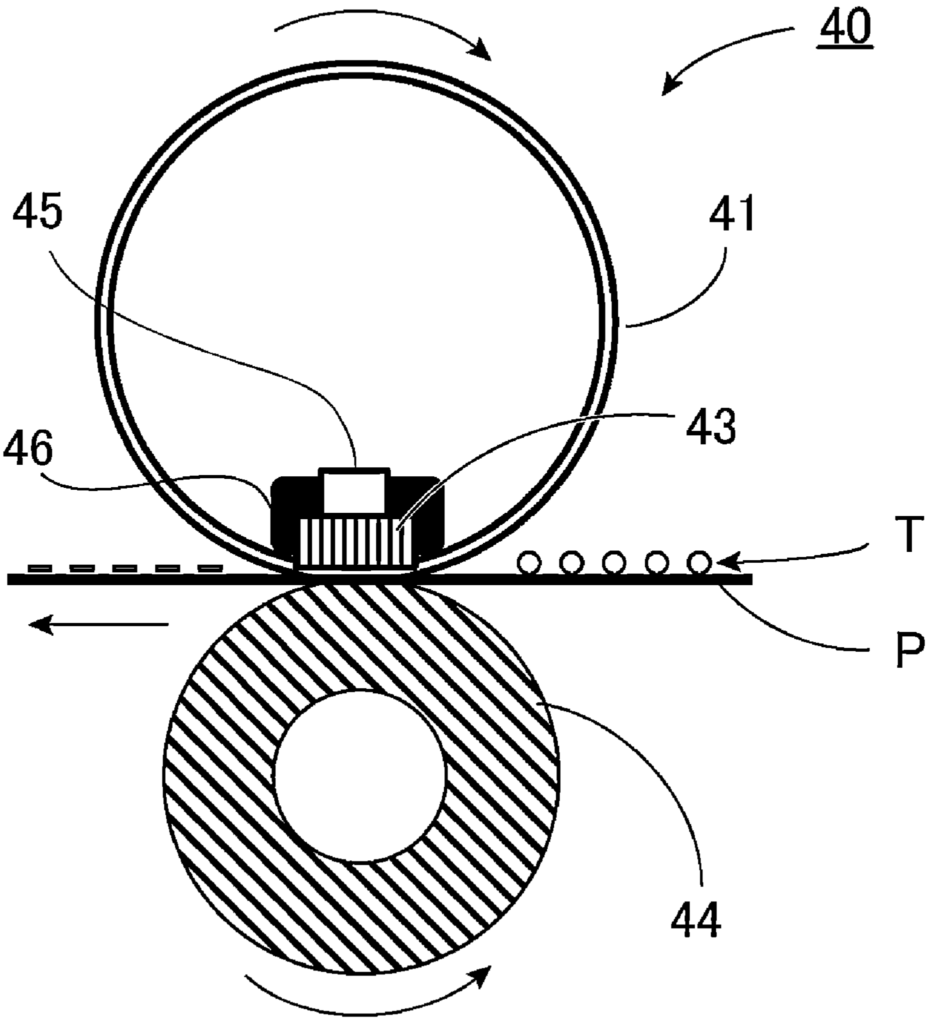
FIG. 2 is a schematic view of a fixing apparatus in accordance with one aspect of the present disclosure.
Figure 3:
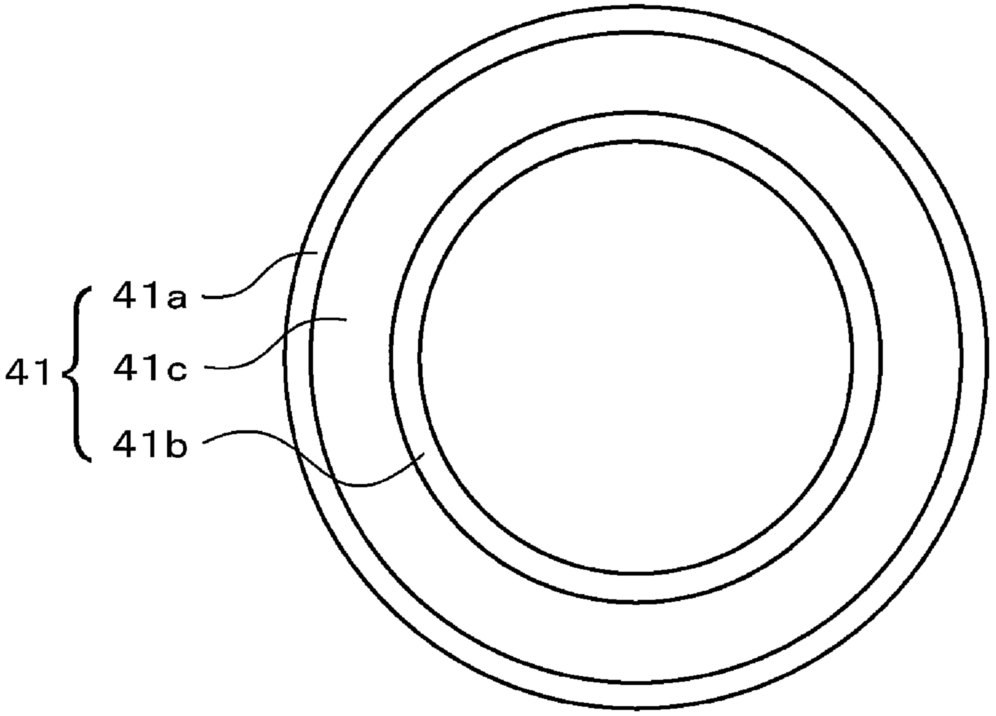
FIG. 3 is a schematic view of a fixing film in accordance with one aspect of the present disclosure.

A fixing member 41 is, for example, a fixing film 41 as shown in FIGS. 2 and 3. The fixing member 41 has a base layer 41*b*, an elastic layer 41*c*, and a surface layer 41*a*. The surface layer 41*a* can be, for example, a release layer having releasability with respect to a toner or the like. The surface layer 41*a* can form the outer surface of the electrophotographic member. Incidentally, the surface layer 41*a* may be bonded to the surface of the elastic layer 41*c* by an adhesion layer not shown. Further, on the inner circumferential surface side of the base layer 41*b*, an inner surface sliding layer not shown may be included.

Below, respective layers will be described specifically.

Base Layer

As the material for the base layer 41*b*, the known one as the electrophotographic member may be used, and there is no particular restriction. For example, a metal such as aluminum, iron, stainless steel (SUS), or nickel, and an alloy thereof, and a heat-resistant resin such as polyimide are used. Stainless steel is preferable. Although the thickness of the base layer 41*b* has no particular restriction, it is preferably set at from 20 μm to 100 μm, and more preferably set at from 20 μm to 50 μm from the viewpoint of, for example, the strength, the flexibility, and the heat capacity.

The outer surface of the base layer 41*b* may be subjected to a surface treatment in order to be imparted with the adhesion with the elastic layer 41*c*. For the surface treatment, physical treatments such as a blast treatment, a lapping treatment, and polishing, and chemical treatments such as an oxidation treatment, a coupling agent treatment, and a primer treatment can be used alone, or in combination of a plurality thereof.

When the surface of the base layer 41*b* is provided with the elastic layer 41*c* including silicone rubber, in order to improve the adhesion between the base layer 41*b* and the elastic layer 41*c*, the surface of the base layer 41*b* is preferably subjected to a primer treatment. Examples of the primer for use in the primer treatment may include a paint obtained by appropriately mixing and dispersing a silane coupling agent, a silicone polymer, hydrogenated methyl siloxane, alkoxy silane, a reaction promoting catalyst, and a colorant such as red iron oxide in an organic solvent.

The primer can be appropriately selected according to the material for the base layer 41*b*, the kind of the elastic layer 41*c*, or the form of the crosslinking reaction. Particularly, when the elastic layer 41*c* includes an unsaturated aliphatic group in a large amount, a primer including a hydrosilyl group is preferably used in order to impart the adhesion by the reaction with an unsaturated aliphatic group. When the elastic layer 41*c* includes a hydrosilyl group in a large amount, a primer including an unsaturated aliphatic group is preferably used.

As the primers, other than these, mention may be made of those including an alkoxy group. As the primer, a commercially available product can be used. Further, the primer treatment includes a step of coating the primer onto the outer surface of the base layer 41*b* (the adhesion surface with the elastic layer 41*c*), and performing drying or burning.

Inner Surface Sliding Layer

On the inner circumferential surface side of the base layer 41*b*, an inner surface sliding layer may be provided. As the inner surface sliding layer, a resin combining high durability and a high heat resistance as with a polyimide resin is suitable. The inner surface sliding layer is gradually worn by being rubbed, and accordingly, preferably has a thickness enough to enable acting as a sliding layer through the use durability test. On the other hand, a thickness not preventing the heat supply from a heater is preferable. For this reason, the thickness is preferably 5 to 20 μm, and more preferably 10 to 15 μm. The inner surface sliding layer may be formed using a known coating method, or the like.

Elastic Layer

For the elastic layer 41_c_, a known one as an electrophotographic member may be used, and there is no particular restriction. The elastic layer 41_c_ preferably includes silicone rubber excellent in heat resistance. Further, as the raw material for silicone rubber, addition curable liquid silicone rubber is preferably used. The elastic layer 41_c_ can be formed by, for example, coating addition curable liquid silicone rubber onto the outer surface of the base layer 41_b_, and performing heating and curing. The coating method has no particular restriction, and a known method may be used.

The thickness of the elastic layer 41_c_ can be appropriately designed in consideration of the surface hardness of the fixing member, and the width of the fixing nip part to be formed, and is preferably from 100 μm to 500 μm, and further preferably from 200 μm to 400 μm.

As the silicone rubber, for example, a cured product of an addition curable liquid silicone rubber mixture described later can be used. The elastic layer 41_c_ can be formed by coating/heating a liquid silicone rubber mixture with a known method.

A liquid silicone rubber mixture usually contains the following components (a) to (d):

Component (a): an organopolysiloxane having an unsaturated aliphatic group;

Component (b): an organopolysiloxane having active hydrogen bonded with silicon;

Component (c): a catalyst;

Component (d): a thermally conductive filler

Each component will be described below.

Component (a)

An organopolysiloxane having an unsaturated aliphatic group is an organopolysiloxane having an unsaturated aliphatic group such as a vinyl group, and examples thereof include those represented by the following formulas (1) and (2). The organopolysiloxane having an unsaturated aliphatic group is preferably linear.

(1)

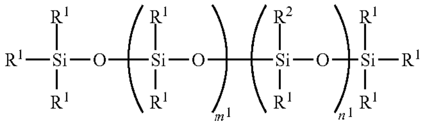

In formula (1), $m^1$ represents an integer of 0 or more, and $n^1$ represents an integer of 3 or more. Further, in structural formula (1), each $R^1$ independently represents a monovalent unsubstituted or substituted hydrocarbon group containing no unsaturated aliphatic group, provided that at least one of $R^1$ represents a methyl group and each $R^2$ independently represents an unsaturated aliphatic group.

(2)

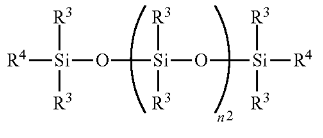

In formula (2), $n^2$ represents a positive integer, and each $R^3$ independently represents a monovalent unsubstituted or substituted hydrocarbon group containing no unsaturated aliphatic group, provided that at least one of $R^3$ represents a methyl group, and each $R^4$ independently represents an unsaturated aliphatic group.

In formulas (1) and (2), examples of the monovalent unsubstituted or substituted hydrocarbon group containing no unsaturated aliphatic group, which can be represented by $R^1$ and $R^3$, include the following groups.

Unsubstituted Hydrocarbon Group

Alkyl group (for example, methyl group, ethyl group, propyl group, butyl group, pentyl group, and hexyl group).

Aryl group (for example, phenyl group).

Substituted Hydrocarbon Group

Substituted alkyl group (for example, chloromethyl group, 3-chloropropyl group, 3,3,3-trifluoropropyl group, 3-cyanopropyl group, and 3-methoxypropyl group).

The organopolysiloxanes represented by formulas (1) and (2) have at least one methyl group directly bonded to the silicon atom forming the chain structure. However, 50% or more of each of $R^1$ and $R^3$ are preferably methyl groups, and more preferably all $R^1$ and $R^3$ are methyl groups, for ease of synthesis and handling.

Also, examples of unsaturated aliphatic groups that can be represented by $R^2$ and $R^4$ in formulas (1) and (2) include the following groups. Examples of unsaturated aliphatic groups include a vinyl group, an allyl group, a 3-butenyl group, a 4-pentenyl group, and a 5-hexenyl group. Among these groups, both $R^2$ and $R^4$ are preferably vinyl groups because synthesis and handling are facilitated, cost is reduced, and a cross-linking reaction can be easily performed.

From the standpoint of moldability, the component (a) preferably has a viscosity of from 1000 $mm^2/s$ to 50000 $mm^2/s$. Where the viscosity is less than 1000 $mm^2/s$, it will be difficult to adjust the hardness to the level required for the elastic layer 20_c_, and where the viscosity is more than 50000 $mm^2/s$, the viscosity of the mixture will be too high, making coating difficult. Viscosity (kinetic viscosity) can be measured using a capillary viscometer, a rotational viscometer, or the like, based on JIS Z 8803:2011.

The blending amount of component (a) is preferably 55% by volume or more from the viewpoint of durability and 65% by volume or less from the viewpoint of heat transfer, based on the liquid silicone rubber mixture used to form the elastic layer 20_c_.

Component (b)

The organopolysiloxane having active hydrogen bonded with silicon functions as a cross-linking agent that reacts with the unsaturated aliphatic group of component (a) under the action of a catalyst to form a cured silicone rubber.

Any organopolysiloxane having a Si—H bond can be used as the component (b). In particular, from the viewpoint of reactivity with the unsaturated aliphatic group of component (a), an organopolysiloxane having an average number of silicon-bonded hydrogen atoms of 3 or more per molecule is preferably used.

Specific examples of component (b) include linear organopolysiloxane represented by formula (3) below and cyclic organopolysiloxane represented by formula (4) below.

(3)

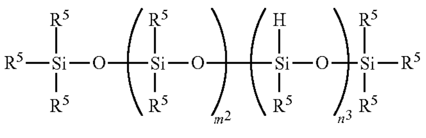

In formula (3), $m^2$ represents an integer of 0 or more, $n^3$ represents an integer of 3 or more, and $R^5$ each independently represents a monovalent unsubstituted or substituted hydrocarbon group containing no unsaturated aliphatic group.

(4)

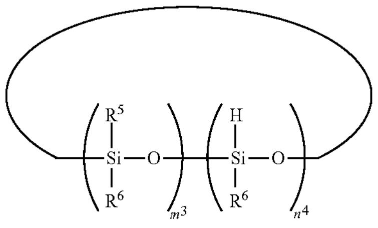

In formula (4), $m^3$ represents an integer of 0 or more, $n^4$ represents an integer of 3 or more, and $R^6$ each independently represents a monovalent unsubstituted or substituted hydrocarbon group containing no unsaturated aliphatic group.

Examples of monovalent unsubstituted or substituted hydrocarbon groups containing no unsaturated aliphatic group that can be represented by $R^5$ and $R^6$ in formulas (3) and (4) include the same groups as those mentioned above for $R^1$ in structural formula (1). Among these, it is preferable that 50% or more of each of $R^5$ and $R^6$ be a methyl group and more preferably all $R^5$ and $R^6$ are methyl groups because synthesis and handling are easy and excellent heat resistance is easily obtained.

Component (c)

Examples of the catalyst used to form the silicone rubber include a hydrosilylation catalyst for accelerating the curing reaction. Known substances such as platinum compounds and rhodium compounds can be used as hydrosilylation catalysts. The blending amount of the catalyst can be appropriately set and is not particularly limited.

Component (d)

The elastic layer 41*c* may include a filler. The filler is to be added for controlling the thermal conductivity, the heat resistance, and the modulus of elasticity. As the thermally conductive filler, mention may be made of a metal, a metal compound, or a carbon fiber. A highly thermally conductive filler is further preferable, and specific examples thereof may include the following materials.

Metal silicon (Si), silicon carbide (SiC), silicon nitride ($Si_3N_4$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), silica ($SiO_2$), copper (Cu), aluminum (Al), silver (Ag), iron (Fe), nickel (Ni), carbon black (C), a carbon nanotube (C), a gas phase growth method carbon fiber, a PAN type (polyacrylonitrile) carbon fiber, and a pitch type carbon fiber.

Adhesive Layer

Between the elastic layer 41*c* and the surface layer 41*a*, an adhesive layer for bonding them may be provided. The materials for the adhesive layer have no particular restriction, and known ones can be used. The adhesive layer preferably includes a silicone rubber adhesive. Although the thickness of the adhesive layer has no particular restriction, it is preferably 1 to 20 μm, and more preferably 3 to 10 μm.

Surface Layer

The surface layer 41*a* includes a tetrafluoroethylene-perfluoroalkyl vinyl ether copolymer (PFA). The surface layer 41*a* preferably includes PFA. With a sample sampled from the surface layer 41*a* as a measurement sample, using a differential scanning calorimeter (DSC), two measurements are performed at a ramp up rate and a ramp down rate both set at 20° C./min. At the endothermic curve at this step, the endothermic peak temperature in the second temperature raising process is 304° C. or less, and the endothermic quantity in the first temperature raising process is 21 J/g or more.

Then, D3 is 40 μm or less where D3 denotes the area average diameter of the spherulite on the outer surface of the surface layer. The reason why the electrophotographic member having such a surface layer can satisfy all the wear resistance to the paper sheet, the image glossiness, and the followability to the unevenness of the paper sheet will be described below together with the description of each configuration of the surface layer.

PFA is a copolymer of perfluoroalkyl vinyl ether (PAVE) and tetrafluoroethylene (TFE). As the means for forming the surface layer 41*a* including PFA, mention may be made of the following method: a dispersion liquid (aqueous dispersion paint) or a powder paint including PFA as the main component is coated onto the surface of the elastic layer 41*c*, which is heated to the melting point or higher for deposition. Alternatively, mention may also be made of a method in which a PFA tube separately manufactured by extrusion molding is coated on the surface of the elastic layer 41*c*, or other methods. The surface layer 41*a* is, for example, a PFA tube.

The endothermic peak in the second temperature raising process in the DSC measurement is the endothermic peak due to the crystal melting of PFA, and means the melting point of PFA. The melting point of PFA is correlated with the rigidity of the molecular chain. A molecular chain with higher rigidity results in PFA with a higher melting point. By adjusting the ratios of PAVE and TFE, it is possible to control the rigidity of the molecular chain of PFA. For example, by using perfluoropropyl vinyl ether as PAVE, and setting the copolymerization ratio (molar ratio) of PAVE and TFE (PAVE/TFE) within a preferable range described later, it is easy to control the melting point at 304° C. or less. From the viewpoint of controlling the melting point, for example, the copolymerization ratio (molar ratio) (PAVE/TFE) is more preferably set closer to 2.0/98.0.

When the endothermic peak temperature (melting point) in the second temperature raising process exceeds 304° C., the rigidity of the molecular chain is high. For this reason, the flexibility as the surface layer is low, so that the followability to the unevenness of a paper sheet is impaired. The endothermic peak temperature in the second temperature raising process being 304° C. or less results in favorable flexibility. This can conceivably result in a fixed image capable of following the unevenness of a paper sheet, and suppressed in toner melting non-uniformity.

PFA has no particular restriction, and a known one can be used. The copolymerization ratio (molar ratio) (PAVE/TFE) of perfluoroalkyl vinyl ether (PAVE) and tetrafluoroethylene (TFE) is preferably 1.5/98.5 to 4.5/95.5, and more preferably 1.5/98.5 to 4.0/96.0. A commercially available PFA may be used. Specifically, mention may be made of AP-230 (trade name, manufactured by DAIKIN INDUSTRIES Ltd.), AP-231SH (trade name, manufactured by DAIKIN INDUSTRIES Ltd.), i.e., PFA with the end group fully fluorinated, and the like.

Being PFA can be confirmed by, for example, confirming the presence of a peak characteristic of polytetrafluoroethylene (PTFE) in the ATR spectrum of FT-IR, and confirming the presence of a small peak in the vicinity of 994 $cm^{-1}$ that will not appear for PTFE.

First, the peaks characteristic of PTFE include 1200 $cm^{-1}$ ($CF_2$ antisymmetric stretch), 1150 $cm^{-1}$ ($CF_2$ symmetric stretch), 640 $cm^{-1}$ ($CF_2$ out-of-plane deformation (wagging)), 555 $cm^{-1}$ ($CF_2$ in-plane deformation (bending)), and 505 $cm^{-1}$ ($CF_2$ in-plane deformation (rocking)). Further, the position of the peak in the vicinity of 994 $cm^{-1}$ characteristic of PFA changes according to the length of a carbon chain at the perfluoro alkyl vinyl ether portion. In the case of perfluoropropoxy group, the peak appears at 994 $cm^{-1}$, in the case of a perfluoroethoxy group, the peak appears at 1090 $cm^{-1}$, and in the case of a perfluoromethoxy group, the peak appears at 881 $cm^{-1}$.

Further, the endothermic quantity in the first temperature raising process at the DSC measurement is the endothermic quantity due to crystal melting of PFA. By dividing the value of the endothermic quantity by the full crystal melting heat (92.9 J/g) of PFA, it is possible to calculate the degree of crystallinity of PFA. The endothermic quantity being 21 J/g or more results in that PFA in the surface layer has the degree of crystallinity. As a result, the wear resistance with respect to a paper sheet becomes favorable.

Further, the endothermic quantity in the first temperature raising process is preferably 27 J/g or less. When the endothermic quantity is 27 J/g or less, the followability to the unevenness of a paper sheet becomes more favorable. The endothermic quantity in the first temperature raising process is preferably 21 to 27 J/g, more preferably 22 to 27 J/g, and further preferably 25 to 27 J/g.

Incidentally, the measurement by DSC in the present disclosure should be according to Japanese Industrial Standards (JIS) K7121-2012 unless otherwise specified.

As the method for setting the endothermic quantity at 21 J/g or more, mention may be made of the following method: in the manufacturing step of a fixing member, the surface layer 41*a* is formed, and then, is heated to a temperature equal to or higher than the melting point of PFA; then, the cooling rate is controlled, thereby promoting the crystallization of PFA.

A specific method has no particular restriction, and the following method of a heat treatment of the surface layer can be used.

After forming the surface layer, in order to heat the entire electrophotographic member region, for example, an upright and cylindrical heating cylinder capable of performing heating up to 330° C. or more is used. In the inside of the heating cylinder, for example, a band heater including a thermocouple mounted therein is set, and the heating temperature of the fixing member is controlled. The heating temperature is preferably from the melting temperature of PFA to 350° C. The heating time may only be enough for the temperature of the surface layer to be able to sufficiently reach a desirable temperature. Examples thereof may include 1 to 20 minutes, 1 to 10 minutes, and 2 to 5 minutes.

After completion of heating, the cooling rate of the heating cylinder is controlled, thereby controlling the cooling rate of the fixing member. For example, an air supply nozzle for air is provided at the outer circumference of the heating cylinder, thereby adjusting the flow rate of the air. As a result, the cooling rate can be controlled. The slower the cooling rate in the crystallization temperature region of PFA is, the more crystallization of PFA can be promoted. Accordingly, the cooling rate is preferably adjusted so that the endothermic quantity may become 21 J/g or more. Control of the cooling rate is preferably performed until the temperature of the surface layer may fall below the crystallization temperature region of PFA. The cooling rate may only fall within the range where the endothermic quantity can be controlled at 21 J/g or more, and has no particular restriction. The cooling rate is preferably 5 to 60° C./min, and more preferably 10 to 30° C./min.

Further, when the endothermic peak temperature in the second temperature raising process is 297° C. or more, the rigidity of the PFA molecule appropriately becomes higher. Accordingly, control of the cooling rate facilitates an increase in endothermic quantity in the first temperature raising process to 21 J/g or more. Due to this, the endothermic peak temperature in the second temperature raising process is preferably 297° C. or more, and further preferably 300° C. or more.

The endothermic peak temperature in the second temperature raising process is preferably 297 to 304° C., more preferably 300 to 304° C., and further preferably 300 to 302° C.

D3 is 40 μm or less where D3 denotes the area average diameter of the spherulite at the outer surface of the surface layer 41*a*. A D3 of 40 μm or less results in favorable surface smoothness, so that a fixed image with high image glossiness can be obtained. A smaller D3 results in more favorable surface smoothness. On the other hand, from the viewpoint of reducing the amorphous part of PFA present in the gap of the lamella structure of the spherulite, suppressing the reduction of the degree of crystallinity, and more improving the wear resistance, D3 is preferably 5 μm or more. The outer surface of the surface layer denotes the surface for forming the outer surface of the electrophotographic member.

D3 is preferably 5 to 40 μm, more preferably 10 to 35 μm, and further preferably 20 to 34 μm. It is considered that the value of D3 can be reduced by increasing the frequency of occurrence of the spherulite nucleus with respect to the crystal growth rate of PFA. For example, mention may be made of the method in which a substance serving as the nucleating agent of a spherulite is allowed to be present on the inner surface side of the surface layer 41*a*, namely, in the vicinity of the surface thereof opposed to the elastic layer. As a result of this, the frequency of occurrence of the spherulite nucleus is increased on the inner surface side.

Then, in the process of cooling of the molten PFA, PFA undergoes growth of the spherulite with the spherulite nucleus as the starting point, and crystal growth stops upon contact with other spherulites. For this reason, when the frequency of occurrence of the spherulite nucleus is high, the diameter of the spherulite formed on the inner surface side of the surface layer is reduced. For the surface layer 41*a*, the smaller the diameter of the spherulite formed on the inner surface side is, the smaller the spherulite diameter at the outer surface becomes. This is considered due to the following. First, a spherulite is formed on the inner surface side, then, the molecule is deposited onto the surface of the spherulite, so that the crystallization proceeds toward the outer surface. Therefore, when the frequency of occurrence of the spherulite nucleus is high on the inner surface side, D3 tends to be reduced, and D3 becomes more likely to be set at 40 μm or less.

In order to allow a substance serving as a nucleating agent to present on the inner surface side of the surface layer, for example, mention may be made of the method in which a PFA tube is used for manufacturing the surface layer 41*a*, and the inner surface thereof is irradiated with an excimer laser light controlled in irradiation conditions. In the excimer laser treatment, a fluorine atom on the PFA tube inner surface leaves, so that the reaction such as generation of a carbonyl group due to carbonization or the reaction with oxygen is effected. As a result, the element ratio on the inner surface changes. The carbon component generated thereby becomes a nucleating agent. For this reason, this method can allow the nucleating agent to be present on the inner surface side.

As described up to this point, for the surface layer including PFA, by setting the endothermic peak temperature in the second temperature raising process at 304° C. or less, setting the endothermic quantity in the first temperature raising process at 21 J/g or more, and setting D3 at 40 μm or less, it is possible to satisfy all of the wear resistance with respect to a paper sheet, the image glossiness, and the followability to the unevenness of a paper sheet.

In the present disclosure, when the carbon element ratio at the surface of the surface layer opposed to the elastic layer is set at C at % (atomic %), and the fluorine element ratio is set at F at %, and the oxygen element ratio is set at O at %, C—F/2-O≥30 is preferably satisfied.

Each ratio falling within the foregoing range results in that the surface of the surface layer opposite to the elastic layer is rich in carbon component, so that the surface smoothness can be made more favorable. This can be considered as follows. The carbon component becomes a nucleating agent of the spherulite, so that the frequency of occurrence of the spherulite nucleus becomes high on the inner surface side of the surface layer. For this reason, D3 is reduced because of the foregoing reason, so that the surface smoothness becomes more favorable.

The C—F/2-O is preferably 30 to 50, and more preferably 32 to 40.

Further, the thickness of the surface layer 41*a* is preferably 30 μm or less. When the thickness is 30 μm or less, the influence of the nucleating agent on D3 on the inner surface side of the surface layer increases, so that the surface smoothness can be made more favorable. The thickness of the surface layer is more preferably 10 to 30 μm, and further preferably 15 to 30 μm.

As the specific method for achieving the foregoing range, the following method can be used. Herein, an example in which a PFA tube is used for manufacturing the surface layer 41*a* will be taken. However, the surface layer in accordance with the present disclosure is not limited to the surface layer formed using a PFA tube.

The PFA tube can be manufactured by, for example, extruding molten PFA from a cylindrical die. Such a PFA tube is quenched in the extrusion process, so that crystallization rapidly progresses. For this reason, the crystal is oriented in the extrusion direction, and the degree of crystallinity is in a low state. The PFA tube is coated on the surface of the elastic layer 41*c*, resulting in the surface layer 41*a*. Then, the surface layer is subjected to a heat treatment. As a result, the degree of crystallinity can be enhanced, and a spherulite is formed on the surface of the surface layer. By enhancing the degree of crystallinity, it becomes easier to control the endothermic quantity in the first temperature raising process within the foregoing range.

The inner surface of the PFA tube can be improved in wettability and adhesion with respect to the elastic layer 41*c*, or the adhesion layer provided, if required, by being previously subjected to a sodium treatment, an excimer laser treatment, an ammonia treatment, or the like. The inner surface of the PFA tube is preferably treated using an excimer laser treatment.

As the excimer laser treatment, preferably, a compound absorbing an ultraviolet ray is deposited on the PFA tube inner surface, and then, an ultraviolet laser light such as a KrF excimer laser light or an ArF excimer laser light is applied thereto. As the compound absorbing an ultraviolet ray, a known one can be used. For example, an aqueous solution obtained by mixing a compound absorbing an ultraviolet ray such as sodium benzoate and a known fluorine type surfactant is manufactured, coated on the PFA tube inner surface, and is air dried.

At the excimer laser treatment, a fluorine atom at the PFA tube inner surface leaves, and the reaction such as generation of a carbonyl group due to carbonization or the reaction with oxygen is effected. As a result, the element ratio at the surface of the surface layer opposite to the elastic layer changes, so that the C—F/2-O becomes more likely to be controlled within the foregoing range.

In the present disclosure, preferably, the irradiation conditions for an excimer laser light are controlled, so that carbonization of the PFA tube inner surface is progressed, thereby setting the element ratio at the surface of the surface layer opposite to the elastic layer within the foregoing range. The irradiation conditions for an excimer laser light are normally selected from the viewpoint of improving the wettability and the adhesion. The irradiation dose per shot or the number of shots is adjusted. In the present disclosure, preferably, the number of shots is made larger than normally required, thereby sufficiently progressing carbonization of the PFA tube inner surface. For example, the irradiation dose of an excimer laser light is preferably 100 to 600 $mJ/cm^2$/pulse, and more preferably 200 to 400 $mJ/cm^2$/pulse. The number of shots is preferably 3 to 10, and more preferably 6 to 8.

Further, D3/D1 is preferably 1.5 or less, where D1 denotes the number-average diameter of spherulites at the outer surface of the surface layer 41*a*. A value of D3/D1 closer to 1 indicates that the distribution of the equivalent circle diameters of the spherulites is narrower and more uniform. D3/D1 being 1.5 or less results in more favorable surface smoothness, so that a fixed image with higher image glossiness can be obtained.

The value of D3/D1 can be reduced by slowing the cooling rate within the crystallization temperature region of PFA at the heat treatment of the surface layer. The D3/D1 is preferably, for example, 1.0 to 1.5. Further, the D1 is preferably 4 to 35 μm, and more preferably 10 to 35 μm.

Further, the arithmetic average roughness Ra of the outer surface of the surface layer 41*a* is preferably 0.20 μm or less. Ra being 0.20 μm or less results in more favorable surface smoothness, so that a fixed image with higher image glossiness can be obtained. By setting the area average diameter D3 at 40 μm or less, it becomes easier to set Ra at 0.20 μm or less. Ra is more preferably 0.05 to 0.20 μm, and further preferably 0.10 to 0.18 μm.

The means for coating the PFA tube on the surface of the elastic layer has no particular restriction, and a known means can be adopted. For example, a method in which a fluorocarbon resin tube is externally expanded, and is coated (expansion coating method) can be used. An expansion coating method in which a PFA tube is externally vacuum expanded, and the like can be used.

Electrophotographic Image Forming Apparatus

Figure 1:
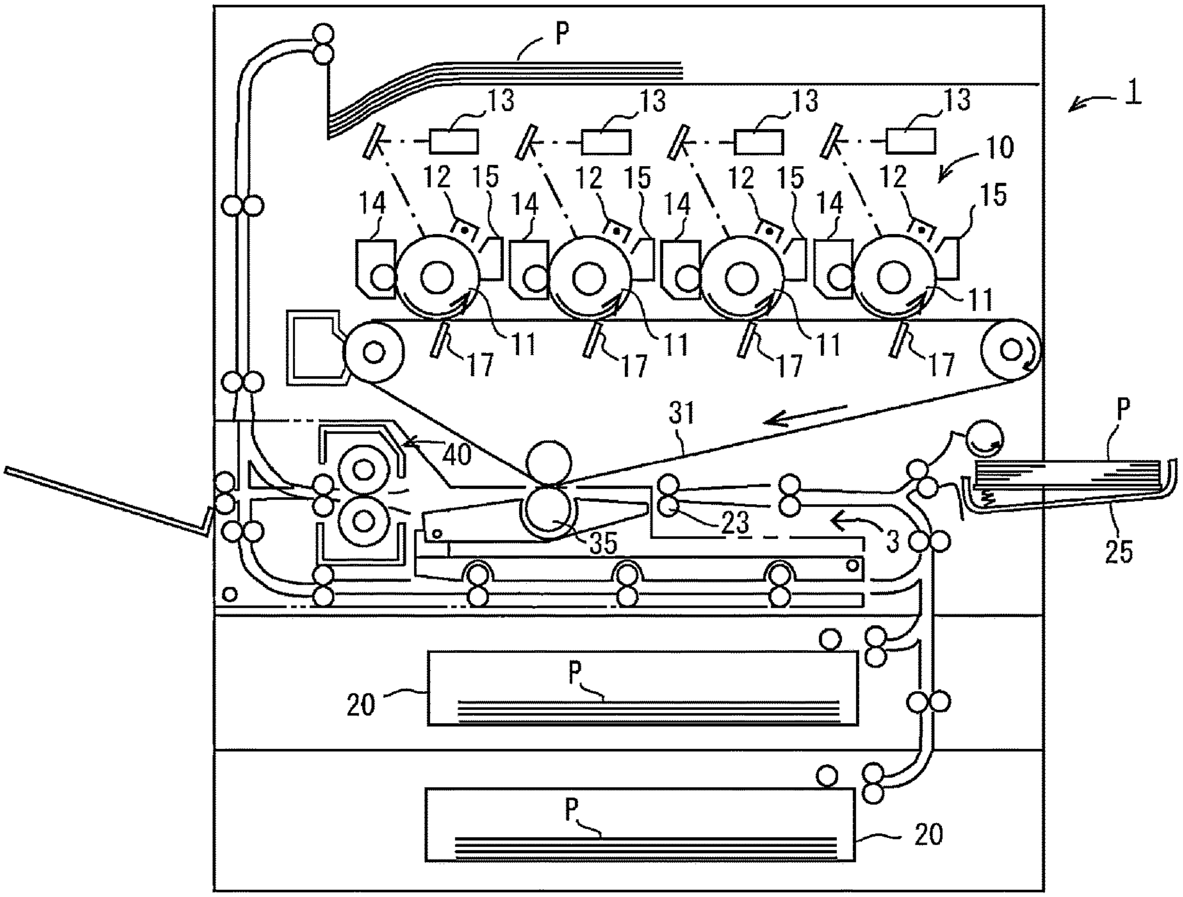
FIG. 1 is a schematic view of an electrophotographic image forming apparatus in accordance with one aspect of the present disclosure.

FIG. 1 is a cross sectional view of a color electrophotographic printer of one example of an electrophotographic image forming apparatus (which will be hereinafter also referred to as an "image forming apparatus") of the present embodiment, and a cross sectional view along the transport direction of the recording material. In the present embodiment, the color electrophotographic printer is referred to simply as a "printer".

A printer 1 shown in FIG. 1 includes an image forming part 10 of each color of Y (yellow), M (magenta), C (cyan), and Bk (black). A photosensitive drum (photosensitive member) 11 is previously charged by a charging device 12. Subsequently, the photosensitive drum 11 is exposed by a laser scanner 13, so that an electrostatic latent image is formed. The electrostatic latent image becomes a toner image by a developing device 14. The toner image of the photosensitive drum 11 is sequentially transferred to, for example, an intermediate transfer belt 31, i.e., an image bearing member by a primary transfer blade 17. After transfer, the toner left on the photosensitive drum 11 is removed by a cleaner 15. As a result of this, the surface of the photosensitive drum 11 becomes clean, and gets ready for the next image formation.

On the other hand, recording materials P are fed one by one in the direction of an arrow 3 from a paper supply cassette 20 or a multi-paper supply tray 25, and are fed into a resist roller pair 23. The resist roller pair 23 once receives the recording material P, and straightens the recording material P when the recording material P goes obliquely. Then, the resist roller pair 23 feeds the recording material P into between the intermediate transfer belt 31 and a second transfer roller 35 in synchronization with the toner image on the intermediate transfer belt 31. The color toner image on the intermediate transfer belt is transferred onto the recording material P by, for example, the second transfer roller 35, i.e., a transfer member. Subsequently, the toner image on the recording material P is fixed on the recording material P by heating and pressurization of the recording material P by a fixing apparatus 40.

The electrophotographic image forming apparatus includes the fixing apparatus 40. Then, the fixing apparatus in the electrophotographic image forming apparatus will be described. The fixing apparatus includes a fixing member and a pressurizing member arranged opposed to the fixing member. FIG. 2 is a schematic block view of the fixing apparatus 40, and is an example of a film heating system heating device (tensionless type). In the present Example, such a heating device was used. However, the process can be carried out even with a roller pair system or film system heating device.

Ref No. 43 represents a ceramic heater (which will be hereinafter described as a heater) as a heating member. The heater 43 includes a long and narrow thin sheet-shaped ceramic substrate with the direction perpendicular to the drawing as the longitudinal direction, and a current carrying heat generating resistance layer provided on the substrate surface as the basic configuration. The heater 43 is a heater with a low heat capacity which is raised in the temperature entirely with a steep rise characteristic due to the passage of a current through the heat generating resistance layer. Further, it is configured such that the current passage region is switched according to the longitudinal width size of the recording material P.

An electrophotographic member in accordance with at least one aspect of the present disclosure can be used as, for example, a fixing member. The fixing film 41 is a cylindrical (endless) heat-resistant fixing member as a heating member for transmitting heat, and is loose fitted onto the support member (heater holder) including the heater 43. The fixing film 41 has a structure as shown in FIG. 3, and is a fixing film having a 3-layer composite structure including at least the surface layer 41*a*, the elastic layer 41*c*, and the base layer 41*b*.

A pressure roller 44 is a heat resistant elastic pressure roller as a pressurizing member, and has a core metal, and an elastic layer including a foamed product of heat resistant rubber such as silicone rubber or fluorocarbon rubber, or silicone rubber. The both ends of the core metal are arranged in a rotatably bearing supported manner. Incidentally, an electrophotographic member in accordance with at least one aspect of the present disclosure can also be used as, for example, a pressurizing member. Namely, at least one of the fixing member and the pressurizing member is preferably the electrophotographic member. For example, the pressurizing member can have the same configuration as that of the fixing film 41. The pressurizing member can have a 3-layer composite structure including the surface layer 41*a*, the elastic layer 41*c*, and the base layer 41*b*.

On the upper side of the pressure roller 44, the fixing film 41/heater 43 are arranged in parallel with the pressure roller 44, and are pressed by a pressing member not shown. With such a configuration, the lower surface of the heater 43 and the upper surface of the pressure roller 44 are pressure welded via the fixing film 41 against the elasticity of the elastic layer 41*c*. As a result, a fixing nip part with a prescribed width can be formed as the heating part.

The pressure roller 44 is rotatively driven at a prescribed rotation circumferential velocity in a counterclockwise direction indicated with an arrow by a driving means not shown. The pressure welding frictional force at the fixing nip part between the pressure roller 44 and the fixing film 41 due to the rotational driving of the pressure roller 44 causes the rotatory power to act on the cylindrical fixing film 41. Then, the fixing film 41 is in a driven rotational state in the clockwise direction indicated with an arrow while sliding in close contact with the downward-facing surface of the heater 43. A support member (heater holder) 46 is also a rotational guide member of the cylindrical fixing film 41.

The pressure roller 44 is rotatively driven, accordingly, the cylindrical fixing film 41 is rendered in a driven rotational state. Further, the heater 43 is energized, so that the heater is rapidly raised in temperature, and rises at a prescribed temperature, resulting in a temperature adjusted state. In such a state, a recording material P bearing an unfixed toner image T is introduced into between the fixing film 41 and the pressure roller 44 at the fixing nip part. Then, the toner image bearing side surface of the recording material P comes in close contact with the outside surface of the fixing film 41 at the fixing nip part, and is sandwiched and transported together with the fixing film 41 to the fixing nip part. The heat of the fixing film 41 heated by the heater 43 in the sandwiching and transporting process heats the recording material P. The unfixed toner image T on the recording material P is heated/pressed on the recording material P, to be molten and fixed. The recording material P which has passed through the fixing nip part T is self-stripped from the surface of the fixing film 41, to be discharged and transported.

A reference No. 45 represents a contact type thermometer (thermistor), and is configured to measure the temperature of the fixing film 41 heated by the heater 43, and to pass the detection result to a temperature controlling means not shown. A reference No. 46 represents a heater holder, and a member for holding the heater 43 which has generated heat to a high temperature.

The examples of the measurement method of each physical property in the present disclosure will be shown below.

Measurement Method of Endothermic Peak Temperature and Endothermic Amount

First, the surface layer is isolated from the electrophotographic member. Specifically, the surface layer is stripped together with the elastic layer from the base layer, and the elastic layer bonded with the surface layer is dissolved by a solvent. As a result, only the surface layer can be isolated. An about 2 mm×2 mm sample is cut out from the isolated surface layer so as to fit into the DSC measuring pan.

The endothermic peak temperature and the endothermic quantity are measured using a differential scanning colorimetry device (trade name: Q2000, manufactured by TA Instruments Co.). For the temperature correction of the device detection part, the melting points of indium and zinc are used. For the correction of the heat amount, the heat of fusion of indium is used. Specifically, the surface layer is weighed in an amount of 4 mg, and is placed in a pan made of aluminum. As the reference, an empty pan made of aluminum is used. The measurement is performed within the measurement range of from 25° C. to 400° C. at a ramp up rate of 20° C./min. At the first measurement, the temperature is raised to 400° C., and is held for 5 minutes. Subsequently, the temperature is lowered at a ramp down rate of 20° C./min to 25° C. Thereafter, the second measurement is performed in the same manner as with the first measurement.

The endothermic quantity represents the area surrounded by the temperature including the endothermic peak-endothermic quantity curve and the base line in the first temperature raising process. Further, the endothermic peak temperature represents the temperature resulting in the maximum endothermic peak of the temperature-endothermic quantity curve at a temperature within the range of 25° C. to 400° C. in the second temperature raising process.

Measurement Method of Area Average Diameter D3 and Number-Average Diameter D1 of Spherulites First, the surface layer is isolated from the electrophotographic member in the same manner as with the measurement of the endothermic peak temperature and the endothermic quantity. Then, the outer surface of the isolated surface layer is observed by a microscope (trade name: ECLIPSE LV100NDA, manufactured by Nikon Corporation), resulting in an observation image of a spherulite. The conditions for observation were switched to transmitted illumination, and an analyzer and a polarizer for transmitted illumination are allowed to intersect at right angles, resulting in adjustment to crossed nicols. Thus, a 20× objective lens is used. By using a transmission polarization microscope, it is possible to obtain an observation image where the structure of the spherulite can be observed.

Then, the outlines of 200 spherulites are manually extracted from the obtained observation image of the spherulite. The conditions for extraction are as follows. Cross shadow referred to as Maltese cross appears in each individual spherulite. Accordingly, with the boundary line of each Maltese cross in the observation image as the outline of the spherulite, extraction is performed. The area of each spherulite is calculated using image analysis software "Image J". The area average diameter D3 and the number-average diameter D1 of the spherulites are calculated from the area of 200 spherulites and the equivalent circle diameter calculated from respective areas, respectively.

Measurement Method of Arithmetic Average Roughness Ra of Outer Surface of Surface Layer The arithmetic average roughness Ra of the outer surface of the surface layer is measured using a contact type roughness meter (trade name: SE-3500, manufactured by Kosaka Laboratory Ltd.). Various conditions in measurement are as follows.

Standard: Japanese Industrial Standards (JIS) B0601: 2001/ISO4287-1997 (roughness)
Cut off wavelength: 0.8 mm
Evaluation length: 4.0 mm
Scanning speed: 1.0 mm/s
Measurement magnification: 5000 times Measurement Method of Carbon Element Ratio, Fluorine Element Ratio, and Oxygen Element Ratio at Surface of Surface Layer Opposed to Elastic Layer First, the surface layer is isolated from the electrophotographic member in the same manner as with the measurement of the endothermic peak temperature and the endothermic quantity. Then, the carbon element ratio C at % (atomic %), the fluorine element ratio F at %, and the oxygen element ratio O at % present on the surface of the isolated surface layer opposite to the elastic layer are measured by ESCA (X-ray photoelectron spectroscopy).

Various conditions in measurement of ESCA are as follows.

Used apparatus: Quantum 2000 manufactured by ULVAC-PHI Inc.
X-ray photoelectron spectrometer measurement condition: X ray source Al Kα
X ray: 100 μm 25 W 15 kV
Pass Energy:
C 58.70 eV
F 93.90 eV
O 58.70 eV The surface element ratio (at %) is calculated from the measured peak intensity of each element using relative sensitivity factor provided by PHI Co. The basis for the element ratio (at %) is the value when the total content of carbon, fluorine, and oxygen is assumed to be 100 at %.

Measurement Method of Thickness of Surface Layer

First, the surface layer is isolated from the electrophotographic member in the same manner as with the measurement of the endothermic peak temperature and the endothermic quantity. Then, the thickness of the isolated surface layer is measured using a micrometer. Examples of the micrometer may include a high accuracy digimatic micrometer ("MDH-25 MB" (trade name) manufactured by Mitutoyo Corporation).

EXAMPLES

Below, the present disclosure will be further described in details by way of Examples and Comparative Examples. However, the present disclosure is not limited thereto.

The measurement method of each physical property in the present Example will be shown below.

Measurement Method of Endothermic Peak Temperature and Endothermic Amount

First, the surface layer was isolated from the electrophotographic member. Specifically, the surface layer was stripped together with the elastic layer from the base layer. The elastic layer bonded with the surface layer was immersed in a silicone resolvent (e SOLVE 21RS manufactured by KANEKO CHEMICAL Co., Ltd.), and was placed in a water tank of an ultrasonic cleaning device (trade name: BRANSONIC (model 2510J-DTH); manufactured by Emerson Japan, Ltd.), and was applied with an ultrasonic wave for 60 minutes, thereby dissolving the elastic layer. A sample was cut out in dimensions of about 2 mm×2 mm from the isolated surface layer so as to fit into the DSC measuring pan.

The endothermic peak temperature and the endothermic quantity were measured using a differential scanning calorimetric analysis apparatus (trade name: Q2000, manufactured by TA Instruments Co.). For the temperature correction of the apparatus detection part, the melting points of indium and zinc were used, and for the correction of the amount of heat, the heat of fusion of indium was used. Specifically, the surface layer was weighed in an amount of 4 mg, and was placed in a pan made of aluminum. As the reference, an empty pan made of aluminum was used. The measurement was performed within the measurement range of from 25° C. to 400° C. at a ramp rate of 20° C./min. For the first measurement, the temperature was raised to 400° C., and was held for 5 minutes. Subsequently, the temperature was lowered to 25° C. at a ramp down rate of 20° C./min. Thereafter, a second measurement was performed in the same manner as in the first measurement.

The endothermic quantity represents the area surrounded by the temperature including an endothermic peak-endothermic quantity curve and a base line in the first temperature raising process. Whereas, the endothermic peak temperature represents the temperature resulting in the maximum endothermic peak of the temperature-endothermic quantity curve at a temperature within the range of 25° C. to 400° C. in the second temperature raising process.

Measurement Method of Area Average Diameter D3 and Number-Average Diameter D1 of Spherulites First, the surface layer was isolated from the electrophotographic member in the same manner as with the measurement of the endothermic peak temperature and the endothermic quantity. Then, the outer surface of the isolated surface layer was observed by a microscope (trade name: ECLIPSE LV100NDA, manufactured by Nikon Corporation), resulting in an observation image of the spherulite. The conditions for observation were switched to transmitted illumination, and an analyzer and a polarizer for transmitted illumination were allowed to intersect at right angles, resulting in adjustment to crossed nicols. Thus, a 20× objective lens was used.

Then, the outlines of 200 spherulites were manually extracted from the obtained observation image of the spherulite. The conditions for extraction are as follows. Cross shadow referred to as Maltese cross appears in each individual spherulite. Accordingly, the boundary line of each Maltese cross in the observation image was extracted as the outline of the spherulite. The area of each spherulite was calculated using image analysis software "Image J". The area average diameter D3 and the number-average diameter D1 of the spherulite were calculated from the area of 200 spherulites and the equivalent circle diameter calculated from respective areas, respectively.

Measurement Method of Arithmetic Average Roughness Ra of Outer Surface of Surface Layer The arithmetic average roughness Ra of the outer surface of the surface layer was measured using a contact type roughness meter (trade name: SE-3500, manufactured by Kosaka Laboratory Ltd.). Various conditions in measurement are as follows.

Standard: Japanese Industrial Standards (JIS) B0601: 2001/ISO4287-1997 (roughness)
Cut off wavelength: 0.8 mm
Evaluation length: 4.0 mm
Scanning speed: 1.0 mm/s
Measurement magnification: 5000 times Measurement Method of Carbon Element Ratio, Fluorine Element Ratio, and Oxygen Element Ratio of Surface of Surface Layer Opposed to Elastic Layer First, the surface layer was isolated from the electrophotographic member in the same manner as with the measurement of the endothermic peak temperature and the endothermic quantity. Then, the carbon element ratio C at %, the fluorine element ratio F at %, and the oxygen element ratio O at % present on the surface of the isolated surface layer opposite to the elastic layer were measured by ESCA (X-ray photoelectron spectroscopy).

Various conditions in measurement of ESCA are as follows.
Used apparatus: Quantum 2000 manufactured by ULVAC-PHI Inc.
X-ray photoelectron spectrometer measurement condition: X ray source Al Kα
X ray: 100 μm 25 W 15 kV
Pass Energy:
C 58.70 eV
F 93.90 eV
O 58.70 eV The surface element ratio (at %) was calculated from the measured peak intensity of each element using relative sensitivity factor provided by PHI Co. The basis for the element ratio (at %) is the value when the total content of carbon, fluorine, and oxygen is assumed to be 100 at %.

Measurement Method of Thickness of Surface Layer

First, the surface layer was isolated from the electrophotographic member in the same manner as with the measurement of the endothermic peak temperature and the endothermic quantity. Then, the thickness of the isolated surface layer was measured using a micrometer "trade name: a high accuracy digimatic micrometer MDH-25 MB manufactured by Mitutoyo Corporation).

Example 1

In the present Example, a fixing film as shown in FIG. 3 was manufactured.

Inner Surface Treatment of PFA Tube

A PFA tube with a thickness of 20 μm obtained by extrusion molding with NEOFLON PFA: AP-231SH (manufactured by DAIKIN INDUSTRIES Ltd.) as the raw material was used. An aqueous solution prepared so that sodium benzoate was in an amount of 5 mass %, and Surflon S-113 (manufactured by AGC Seimi Chemical Co., Ltd.) was in an amount of 1 mass % was coated on the entire surface region on the inner side of the PFA tube, and was air dried. Subsequently, a 300-mJ/cm$^2$/pulse KrF excimer laser light was applied thereto 6 shots, resulting in a PFA tube which has undergone the inner surface treatment.

Base Layer

SUS with an inside diameter of 24 mm and a thickness of 30 μm was used as the base layer.

Formation of Inner Surface Sliding Layer

First, aromatic tetracarboxylic acid dianhydride or a derivative thereof and aromatic diamine were allowed to react with each other in substantially equimolar amounts in an aprotic polar organic solvent, resulting in a polyimide precursor solution. The resulting polyimide precursor solution was coated onto the internal circumferential surface of the base layer by a ring coating method. The solvent was dried in an electric furnace, and then was heated at 260 to 400° C. for about 1 hour, thereby forming an inner surface sliding layer. The thickness of the inner surface sliding layer was set at 12 μm.

Formation of Primer Layer and Elastic Layer

A primer layer and an elastic layer were formed with respect to the base layer including the inner surface sliding layer formed thereon with the following procedure.

A hydrosilyl type silicone primer (DY39-051 A/B; manufactured by DOW and TORAY Co.) was coated onto the base layer, and was heated and cured at 200° C. for 5 minutes. On the primer layer, a liquid addition curable silicone rubber mixture including the following components (a) to (d) mixed therein was coated with a thickness of 250 μm, and was heated and cured at 200° C. for 30 minutes, thereby forming a silicone rubber elastic layer with a thickness of 250 μm.

Silicone Rubber Mixture

Component (a): linear chain type organopolysiloxane having an unsaturated aliphatic group Component (b): organopolysiloxane having active hydrogen bonded with silicon Component (c): a catalyst Component (d): a thermally conductive filler First, as the component (a), 100 parts by mass of a silicone polymer having a vinyl group, i.e., an unsaturated aliphatic group at only each opposite end of the molecular chain, and having a methyl group as a non-substituted hydrogen carbide group not including other unsaturated aliphatic groups was prepared. The silicone polymer (trade name: DMS-V35, manufactured by Gelest Co., viscosity 5000 $mm^2/s$) will be hereinafter referred to as "Vi".

Then, to theVi, alumina (trade name: ALUNABEADS CB-P10, manufactured by Showa Denko Co., Ltd.) was added in an amount of 370 parts by mass as the component (d), and the mixture was set in a rotation-revolution mixer (ARV-5000 manufactured by THINKY Co.), and was mixed with stirring for two minutes at 600 rpm, resulting in a mixture 1.

Then, the one obtained by dissolving 0.2 part by mass of 1-ethynyl-1-cyclohexanol (manufactured by Tokyo Chemical Industry Co.) of a curing retardant in the same weight of toluene was added into the mixture 1, resulting in a mixture 2.

Then, as the component (c), a hydrosilylated catalyst (platinum catalyst: a mixture of 1,3-divinyl tetramethyldisiloxane platinum complex, 1,3-divinyl tetramethyldisiloxane, and 2-propanol) was added in an amount of 0.1 part by mass into the mixture 2, resulting in a mixture 3.

Further, as the component (b), a silicone polymer having a linear siloxane skeleton and having an active hydrogen group bonded with silicon only at the side chain (trade name: HMS-301, manufactured by Gelest Co, viscosity 30 $mm^2/s$, which will be hereinafter referred to as "SiH") was weighed in an amount of 1.1 parts by mass. This was added to the mixture 3, and was sufficiently mixed, resulting in a liquid addition curable silicone rubber mixture.

Coating of Adhesive Layer

After forming the elastic layer, an adhesive (SE1819CV A/B; manufactured by DOW and TORAY Co.) was coated with a thickness of 7 μm on the elastic layer using the ring coating method.

Formation of Surface Layer

After coating the adhesive, as the surface layer, the above-mentioned PFA tube which has already undergone an inside surface treatment was coated on the adhesive with a method for external vacuum expansion and coating (vacuum expansion coating method).

Specifically, the inside surface of an external cylinder having a larger inside diameter than the outside diameter of a work after forming the elastic layer coated with the adhesive is allowed to adsorb the PFA tube in a vacuum state for diameter expansion, and the work was inserted thereinto. Then, the vacuum was released, resulting in coating on the adhesive. The extra adhesive and air between the PFA tube and the elastic layer was stripped off by an O ring, or the like. Then, by a heating means such as an electric furnace, the adhesive was cured/bonded. Specifically, using an electric furnace, heating was performed at 200° C. for 2 minutes. Thereafter, both the ends were cut to a desirable length (336.5 mm).

Heating Treatment of Surface Layer

After cutting both the ends to a desirable length, the resulting sample was inserted into a heating cylinder with an inside diameter of q42 mm, and the entire region was subjected to a heating treatment by a band heater inside of the heating cylinder. The heating temperature was set at 330° C., and the heating treatment was performed so that the real temperature of the surface layer may become equal to or higher than the melting temperature of PFA.

The heating time was set at 3 minutes after charging the fixing film into the heating cylinder as the time required for the actual temperature of the surface layer to be able to sufficiently reach a desirable heat treatment temperature. After an elapse of 3 minutes from charging, the heating cylinder was cooled to 200° C. at a rate of 20° C./min, and then, the sample was taken out from the heating cylinder to under normal temperatures atmosphere, resulting in a fixing film.

The endothermic peak temperature, the endothermic quantity, and the values of D3, D1, Ra, and C—F/2-O of the manufactured fixing film were determined. The results are shown in Table 1.

Evaluation of Followability to Unevenness (Melting Non-Uniformity) of Paper Sheet By observing the molten state of the toner after fixing the toner image formed onto a paper sheet, it is possible to provide the indicator of the followability of the fixing member to the paper unevenness.

Using a fixing apparatus 40 of the same film heating system as that for the evaluation of the wear resistance, 10 melting non-uniformity evaluation images were consecutively fixed under environment of a temperature of 10° C. and a relative humidity of 50%. As the paper sheet, an A4-sized recycled paper sheet (trade name: recycled paper GF-R100; manufactured by CANON INC, 92 μm in thickness, 66 $g/m^2$ in basis weight, 70% in wastepaper mixing ratio, and 23 seconds in Bekk's smoothness (measured with the method according to Japanese Industrial Standards (JIS) P8119: 1998)) was used. The melting non-uniformity evaluation image is the image obtained by arranging a 10 mm×10 mm patch image formed of a cyan toner and a magenta toner in a concentration of 100% in the vicinity of the paper sheet surface central part.

The index for the melting non-uniformity is as follows. The image part formed of two colors is sufficiently applied with a heat and a pressure, so that the toner is molten, thereby causing color mixture. Particularly, at the depressed portion of the paper sheet unevenness, when a pressure is not applied even if a heat is applied, the grain boundary of the toner is left after fixing. For this reason, melting non-uniformity is caused with color mixture not sufficiently caused. When the fixing member cannot sufficiently follow the unevenness, the protruded portion is applied with a pressure, thereby causing color mixture. However, at the depressed portion, color mixture becomes insufficient. For this reason, the determination of the followability to the unevenness was confirmed by observing the molten state of the image formation region.

After consecutively printing 10 melting non-uniformity evaluation images, the tenth sample was taken out, and the image formation part was observed by an optical microscope, thereby evaluating the melting non-uniformity. The evaluation criteria are as follows. When the evaluation results with the following evaluation criteria were A to C, it was determined that the effects of the present disclosure could be obtained.

Evaluation Criteria

- A: Even at the depressed portion of a paper fiber, a toner grain boundary is not observed at all, and color mixture is caused in both the depressed portion and the protruded portion.
- B: Even at the depressed portion of a paper fiber, a toner grain boundary is scarcely observed, and color mixture is caused in both the depressed portion and the protruded portion.
- C: At the depressed portion of a paper fiber, a toner grain boundary is partially observed, and color mixture is generally caused in both the depressed portion and the protruded portion.
- D: At only the protruded portion of a paper fiber, color mixture is caused, and at the depressed portion, a large number of toner grain boundaries are observed.

Evaluation of Wear Resistance

Evaluation of the wear resistance was performed using a film heating system fixing apparatus 40 shown in FIG. 2 including the manufactured fixing film built therein. With the pressurizing force set so as to be 156.8 N for one end side thereof, and to be 313.6 N (32 kgf) for the total pressurizing force, rotative driving was performed so that the moving speed (circumferential speed) of the pressure roller surface may become 320 mm/sec. With the paper feed part surface temperature of the fixing film controlled at 170° C., the same-sized paper sheets (A4 horizontal, GF-C068) were continuously fed at 70 sheets/min. When the results of the evaluation according to the following evaluation criteria were A to C, it was determined that the effects of the present disclosure was obtained.

Evaluation Criteria

- A: even when 500000 paper sheets are fed, abrasion of the surface layer is scarcely observed
- B: even when 200000 paper sheets are fed, abrasion of the surface layer is scarcely observed, however when 500000 paper sheets are fed, slight abrasion of the surface layer due to the paper sheet end is observed
- C: when 200000 paper sheets are fed, slight abrasion of the surface layer due to the paper sheet end is observed, and when 500000 paper sheets are fed, definite abrasion of the surface layer due to the paper sheet end is observed
- D: When 200000 paper sheets are fed, definite abrasion of the surface layer due to the paper sheet end is observed Evaluation of Image Gloss Value Evaluation of the image gloss value was performed using the fixing apparatus 40 of the same film heating system as that for the evaluation of the wear resistance. Under environment of a temperature of 23° C. and a relative humidity of 50%, with the paper feed part surface temperature of the fixing film controlled at 160° C., a black solid image was fixed. For the paper sheet, a A4-sized paper sheet (trade name: GFC-081 (81.0 g/m$^2$); commercially available from CANON MARKETING JAPAN Co., Ltd.) was used. The 60° gloss of the outputted image was measured with a gloss meter (handy type gloss meter PG-1M manufactured by NIPPON DENSHOKU INDUSTRIES Co., Ltd.), and the average value thereof was evaluated according to the following criteria.

The 60° glass is the gloss value measured at an incident angle of 60°. In the case of the incident angle of 60°, the gloss value is the value when the specular reflectance (10%) of a light at the glass surface layer whose refractive index is 1.567 over the entire visible wavelength region is assumed to be 100. When the results of the evaluation according to the following evaluation criteria are A to C, it was determined that the effect of the present disclosure was obtained.

Evaluation Criteria

- A: gloss is 10 or more
- B: gloss is 8 or more and less than 10
- C: gloss is 6 or more and less than 8
- D: gloss is less than 6

Example 2

A fixing film was obtained in the same manner as in Example 1, except for changing the raw material for the PFA tube to NEOFLON PFA: AP-230 (manufactured by DAIKIN INDUSTRIES Ltd.).

Example 3

A fixing film was obtained in the same manner as in Example 1, except for changing the cooling rate of the heating cylinder to a rate of 50° C./min in the heat treatment of the surface layer.

Example 4

A fixing film was obtained in the same manner as in Example 1, except for changing the cooling rate of the heating cylinder to a rate of 60° C./min in the heat treatment of the surface layer.

Example 5

A fixing film was obtained in the same manner as in Example 1, except for changing the number of shots of a KrF excimer laser light to 5 in the inner surface treatment of the PFA tube.

Example 6

A fixing film was obtained in the same manner as in Example 1, except for changing the raw material for the PFA tube to NEOFLON PFA: AP-230 (manufactured by DAIKIN INDUSTRIES Ltd.), and changing the cooling rate of the heating cylinder to a rate of 8° C./min in the heat treatment of the surface layer.

Example 7

A fixing film was obtained in the same manner as in Example 1, except for changing the thickness of the PFA tube to 30 μm.

Example 8

A fixing film was obtained in the same manner as in Example 1, except for changing the thickness of the PFA tube to 40 μm.

Example 9

A fixing film was obtained in the same manner as in Example 1, except for changing the number of shots of a KrF excimer laser light to 10 in the inner surface treatment of the PFA tube.

Comparative Example 1

The raw material for the PFA tube was changed to 451HP-J (manufactured by Chemours-Mitsui Floroproducts Co., Ltd.), and the number of shots of a KrF excimer laser light was changed to 2 in the inner surface treatment of the PFA tube. Further, after an elapse of 3 minutes from charging of the fixing film to the heating cylinder in the heat treatment of the surface layer, without cooling the heating cylinder, the fixing film was taken out from the heating cylinder to under normal temperatures atmosphere, and was air dried, resulting in a fixing film.

A fixing film was obtained in the same manner as in Example 1, except for the foregoing procedure.

Comparative Example 2

The raw material for the PFA tube was changed to P-66P (manufactured by AGC Inc.), and the number of shots of a KrF excimer laser light was changed to 2 in the inner surface treatment of the PFA tube. Further, after an elapse of 3 minutes from charging of the fixing film to the heating cylinder in the heat treatment of the surface layer, without cooling the heating cylinder, the fixing film was taken out from the heating cylinder to under normal temperatures atmosphere, and was air dried, resulting in a fixing film.

A fixing film was obtained in the same manner as in Example 1, except for the foregoing procedure.

Comparative Example 3

A fixing film was obtained in the same manner as in Example 1, except for changing the raw material for the PFA tube to 959HP Plus (manufactured by Chemours-Mitsui Floroproducts Co., Ltd.), and changing the number of shots of a KrF excimer laser light to 2 in the inner surface treatment of the PFA tube.

Comparative Example 4

The number of shots of a KrF excimer laser light was changed to 2 in the inner surface treatment of the PFA tube. Further, after an elapse of 3 minutes from charging of the fixing film to the heating cylinder in the heat treatment of the surface layer, without cooling the heating cylinder, the fixing film was taken out from the heating cylinder to under normal temperatures atmosphere, and was air dried.

A fixing film was obtained in the same manner as in Example 1, except for the foregoing procedure.

Comparative Example 5

A fixing film was obtained in the same manner as in Example 1, except for changing the number of shots of a KrF excimer laser light to 2 in the inner surface treatment of the PFA tube.

The endothermic peak temperature, the endothermic quantity, and the values of D3, D1, Ra, and C—F/2-O of each fixing film manufactured in Examples 2 to 9, and Comparative Examples 1 to 5 were determined. Further, the evaluation of the wear resistance, the evaluation of the melting non-uniformity, and the evaluation of the image glossiness were performed on the basis of the same evaluation methods as those of Example 1. The results are shown in Table 1.

TABLE 1

| | | | | | | | | | Evaluation | | |
|---|---|---|---|---|---|---|---|---|---|---|---|
| Example No. | Endothermic peak temperature [° C.] | Endothermic quantity [J/g] | D3 [μm] | D1 [μm] | D3/D1 | Ra [μm] | C-F/2-O | Thickness [μm] | Toner melting non-uniformity | Wear resistance | Image glossiness |
| 1 | 300 | 27 | 30 | 25 | 1.2 | 0.16 | 34 | 20 | A | A | A |
| 2 | 304 | 27 | 31 | 26 | 1.2 | 0.17 | 33 | 20 | B | A | A |
| 3 | 300 | 22 | 27 | 18 | 1.5 | 0.15 | 34 | 20 | A | B | A |
| 4 | 300 | 21 | 27 | 17 | 1.6 | 0.15 | 34 | 20 | A | C | B |
| 5 | 300 | 27 | 40 | 33 | 1.2 | 0.20 | 30 | 20 | A | A | B |
| 6 | 304 | 28 | 32 | 27 | 1.2 | 0.17 | 33 | 20 | C | A | A |
| 7 | 300 | 27 | 30 | 25 | 1.2 | 0.16 | 34 | 30 | A | A | A |
| 8 | 300 | 27 | 40 | 33 | 1.2 | 0.20 | 34 | 40 | A | A | B |
| 9 | 300 | 21 | 5 | 4 | 1.3 | 0.06 | 36 | 20 | A | C | A |
| C.E. 1 | 307 | 28 | 10 | 6 | 1.6 | 0.07 | 26 | 20 | D | A | B |
| C.E. 2 | 305 | 28 | 33 | 19 | 1.7 | 0.17 | 26 | 20 | D | A | B |
| C.E. 3 | 296 | 15 | 4 | 3 | 1.2 | 0.05 | 26 | 20 | A | D | A |
| C.E. 4 | 300 | 18 | 36 | 20 | 1.8 | 0.18 | 26 | 20 | A | D | C |
| C.E. 5 | 300 | 27 | 60 | 43 | 1.4 | 0.30 | 26 | 20 | A | A | D |

In the Table, "C.E." indicates "Comparative Example". The endothermic peak temperature denotes the endothermic peak temperature in the second temperature raising process by DSC, and the endothermic quantity denotes the endothermic quantity in the first temperature raising process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-104692, filed Jun. 27, 2023, which is hereby incorporated by reference herein in its entirety.

What is claimed is:

1. An electrophotographic member comprising:

at least a base layer; an elastic layer; and a surface layer in this order, wherein the surface layer comprises a tetrafluoroethylene-perfluoroalkyl vinyl ether copolymer, at an endothermic curve upon performing two measurements at a ramp up rate and a ramp down rate both set at 20° C./min using a differential scanning calorimeter (DSC) with a sample sampled from the surface layer as a measurement sample, an endothermic peak temperature in a second temperature raising process is 304° C. or less, an endothermic quantity in a first temperature raising process is 21 J/g or more, D3 is 40 μm or less, where D3 represents an area average diameter of a spherulite at an outer surface of the surface layer, and D3/D1 is 1.5 or less, where D1 represents a number-average diameter of the spherulite at the outer surface of the surface layer.

2. The electrophotographic member according to claim 1, wherein an arithmetic average roughness Ra of an outer surface of the surface layer is 0.20 μm or less.

3. The electrophotographic member according to claim 1, wherein the D3 is 5 μm to 40 μm.

4. The electrophotographic member according to claim 1, wherein the endothermic quantity in the first temperature raising process is 21 J/g to 27 J/g.

5. The electrophotographic member according to claim 1, wherein the endothermic peak temperature in the second temperature raising process is 297° C. to 304° C.

6. The electrophotographic member according to claim 1, wherein the endothermic peak temperature in the second temperature raising process is 300° C. to 304° C.

7. The electrophotographic member according to claim 1, wherein $C-F/2-O \geq 30$ is satisfied, where C at % represents a carbon element ratio at a surface of the surface layer opposed to the elastic layer, F at % represents a fluorine element ratio thereof, and O at % represents an oxygen element ratio thereof.

8. The electrophotographic member according to claim 1, wherein a thickness of the surface layer is 30 μm or less.

9. The electrophotographic member according to claim 1, wherein a thickness of the surface layer is 10 μm to 30 μm.

10. The electrophotographic member according to claim 1, wherein the electrophotographic member is an electrophotographic belt having an endless shape.

11. The electrophotographic member according to claim 10, wherein the electrophotographic member is a fixing belt.

12. A fixing apparatus in an electrophotographic image forming apparatus, the fixing apparatus comprising:

a fixing member; and a pressurizing member arranged opposed to the fixing member, wherein at least one of the fixing member and the pressurizing member is the electrophotographic member according to claim 1.

13. An electrophotographic image forming apparatus comprising a fixing apparatus, wherein the fixing apparatus includes a fixing member, and a pressurizing member arranged opposed to the fixing member, and at least one of the fixing member and the pressurizing member is the electrophotographic member according to claim 1.

* * * * *